June 22, 1937.  E. S. MASON ET AL  2,084,773
DOUGH MIXER CONSTRUCTION
Filed May 17, 1935  2 Sheets-Sheet 1
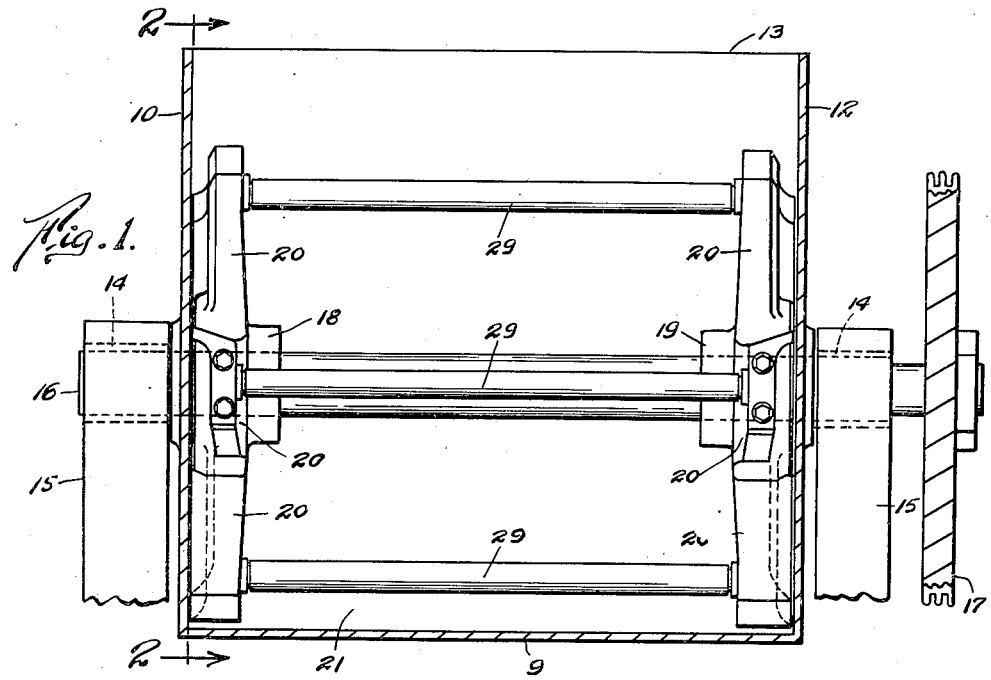
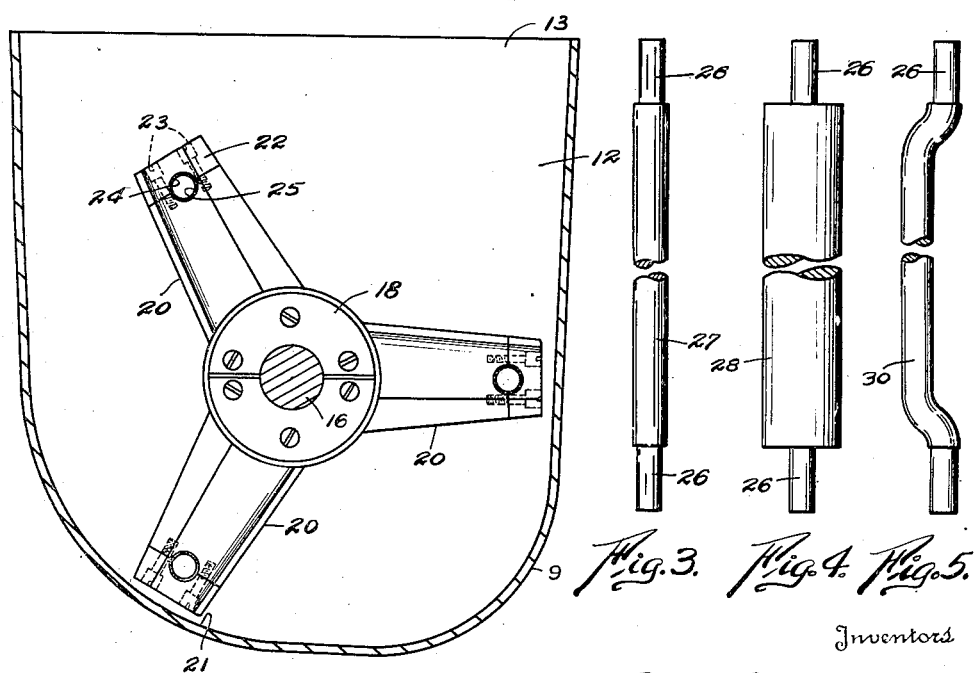
Inventors
Erwin S. Mason
William G. Kirchhoff
By Murray & Zugelter
Attorneys.

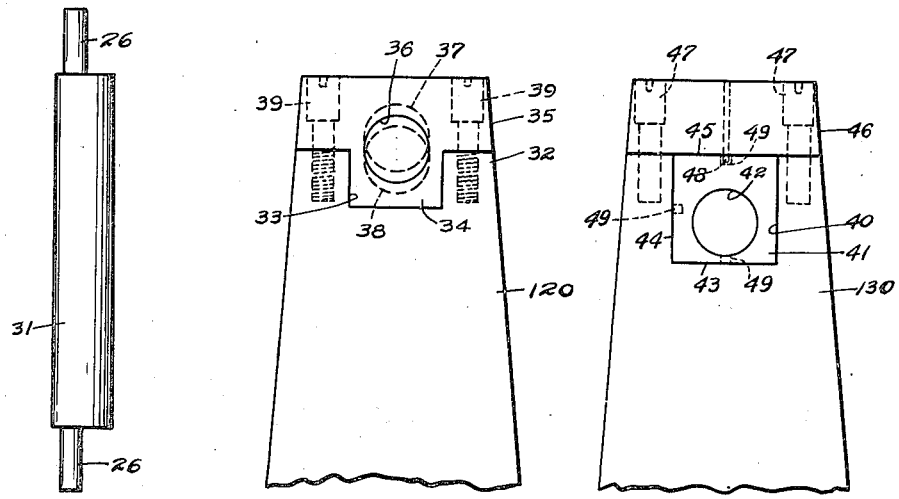

Patented June 22, 1937

2,084,773

UNITED STATES PATENT OFFICE 2,084,773

DOUGH MIXER CONSTRUCTION

Erwin S. Mason, Norwood, and William G. Kirchhoff, Cincinnati, Ohio, assignors to The J. H. Day Company, Cincinnati, Ohio, a corporation of Ohio Application May 17, 1935, Serial No. 22,018

8 Claims. (Cl. 259—109)

This invention relates to a dough mixer construction.

An object of the invention is to provide a dough mixer construction with means whereby the baker may readily adapt the dough mixer to properly mix and stretch doughs of various consistencies or ingredient ratios, according to the baker's requirements.

Another object is to provide means for the above purpose which is simple and inexpensive, and which will not objectionably weaken the mixer structure or the agitator thereof.

More specifically, an object of the invention is to provide a simple, inexpensive, and easily manipulated means for changing the character and the effectiveness of the agitating element of the machine, in accordance with the nature of the substance to be mixed.

Another object of the invention is to provide a mixing machine in which the agitator is so constructed as to permit ready interchangeability of agitating bars, for the purposes stated.

The foregoing and other advantages are attained by the means described herein and disclosed in the accompanying drawings, in which:

Fig. 1 is a fragmental cross sectional view of a dough mixer embodying the invention, certain parts being shown in elevation.

Fig. 2 is a cross sectional view taken on line 2—2 of Fig. 1.

Figs. 3, 4, 5, and 6 are elevational views of minor sizes and forms of agitator bars that are easily interchangeable in the mixer.

Figs. 7 and 8 are fragmental elevational views of an agitator arm, showing two forms of agitator bar mountings, in addition to the form disclosed in Fig. 2.

In many baking establishments, it has been common practice to use the same dough mixer, or like dough mixers, in the mixing of doughs for all kinds of bread products. It has been known that the doughs for different kinds of bread such as rye, white, whole wheat, bran bread and others, require different characters of mixing operations, and in some cases, different mixing periods, but no practically satisfactory means have ever been devised, to our knowledge, for accomplishing varied dough working operations in a single mixer. The patent of J. C. Gordon #1,187,521 is mentioned as disclosing one form of means for adjusting the mixing bars of an agitator to accomplish a proper working or manipulating of various kinds of dough, and it is to be considered an object of the present invention to provide improved and more practical and inexpensive means for accomplishing the results sought by Gordon.

Figs. 1 and 2 of the accompanying drawings illustrate a dough mixer wherein 9 indicates a tank for ingredients, which tank includes end walls 10 and 12 and an open top 13. In some, but not all constructions, the tank is provided with trunnions 14 whereby the tank is tiltably mounted relative to a pair of supporting standards 15. This feature, however, is immaterial to the present invention. In the embodiment shown, a main or central shaft 16 extends through the trunnions, and lengthwise within the tank, said shaft being adapted for rotation therein by any suitable means, for example, a sprocket 17 to be driven by means of a chain and motor, not shown. Within the tank, the main shaft has fixedly mounted thereon, in spaced relation and in close proximity with opposite end walls of the tank, the agitator spiders 18 and 19, so that the spiders rotate with the main shaft when power is applied thereto. The spiders constitute the body of the agitator. Each spider comprises a plurality of agitator arms 20 which extend radially from the hubs of the spiders, said arms being of such length as to move in close proximity with the usual wall or working surface 21 of the tank. Although in practice the spiders are keyed or splined upon the main shaft, the precise manner of fixing these elements for unitary rotational movement is a matter of indifference to the present invention.

In accordance with the disclosure of Figs. 1 and 2, the free end of each agitator arm is provided with a removable bearing cap or cover 22 which may normally be secured in position upon the agitator arm by the use of any suitable securing device, for example, screws or bolts 23. Each cap or cover 22 is formed with a semicircular indentation 24 which cooperates with a similar indentation 25 of the agitator arm, to provide a circular journal or bearing for the reduced end 26 of any one of the agitator bars disclosed in Figs. 3 to 6, inclusive. The agitator bars of Figs. 3 and 4, indicated by the characters 27 and 28, respectively, are straight rod agitator bars of different diameters, that may be substituted for the agitator bars 29 shown in Fig. 1. The bar of Fig. 5 indicated by the character 30, is a swinging rod agitator bar, and that indicated at 31 of Fig. 6 is an eccentric roll agitator bar, either of which may be substituted for another in the agitator structure of Fig. 1. To substitute these various agitator bars one for another, it is necessary only to remove the bearing caps or covers 22 by first withdrawing the screws or bolts 23. Upon removal of the caps or covers, the reduced ends 26 of the various agitator bars may be fitted in place, and clamped tightly within the bearings 24—25 by means of the screws or bolts which maintain the bearing cap in position upon the ends of the spider arms. The type or size of agitator bars to be applied to the arms 20, will depend upon the character of dough to be mixed, especially as respects the ratio of ingredients and the fluidity of the mass initially, and also the consistency or stiffness to be expected in the mass when it reaches the plastic state. As will be understood, the application of the larger sized agitator rods to the spiders results in decreasing the space between the mixer tank and the agitator proper, which condition is favorable for certain kinds of dough, whereas the application of other agitator bars which do not so closely approach the tank interior, results in a condition favorable for other types of dough. It is to be understood that the bearing caps or covers 22 may either tightly or loosely engage the reduced ends 26 of the various agitator bars, to maintain the bars in fixed relation to the agitating arms, or permit them to rotate, as desired. To prevent excessive wear in the bearings 24—25, a suitable bushing may be inserted therein, if desired. In the preferred construction, the reduced ends 26 of all the different types of agitator bars are turned or formed to a common diameter, so that they may be substituted one for another at the pleasure of the operator.

Attention is now directed to Fig. 7 which discloses a modification wherein 120 indicates a spider arm similar to the arm 20 of Fig. 2, the free end 32 of which arm is notched or otherwise adapted as at 33, to receive an extending portion 34 of an end cover or bearing element 35. In this form of construction, the bearing element 35 is bored transversely, as at 36, to receive an end 26 of any one of the agitator bars disclosed in Figs. 3–6 inclusive. The broken lines 37 and 38 indicate various positions of bores in the bearing element, whereby the substitution of differently bored bearing elements 35 has substantially the same effect as the substitution of agitator bars. As is evident, a bearing element such as 35 with the bore located as indicated at 37, would dispose an agitator bar in closer proximity with the tank wall, than would a similar bearing element bored as indicated at 38. Like the bearing caps or covers of Fig. 2, the bearing element 35 of Fig. 7 may be secured in fixed relation with the spider arm by the use of any suitable fastening devices, such as screws or bolts 39.

In accordance with the modification illustrated by Fig. 8, a spider arm 130 is slotted at its upper end, as indicated by the character 40, to receive a bearing element 41 which is regular in geometric shape, the shape herein disclosed for the purpose of illustration being a square. The bearing element 41 carries a bore 42 which is located therein at different distances from three of the sides 43, 44, and 45, so that the axis of the bore may be located at different radial positions or distances from the axis of rotation of the spider, thereby to dispose any agitator bar, supported in the bore 42, at different radial distances from the agitator axis or main shaft. Thus it will be understood that by removing the bearing cap or cover 46 after withdrawing the fastening means 47, the bearing element 41 may be lifted from the slot 40, rotated through ninety degrees, and re-inserted in the slot or seat 40, thereby to shift the axis of the bore 42 to a position farther removed from the axis of rotation of the agitator or spider. Instead of removing the bearing element 41 and rotating it through ninety degrees, it may be rotated through one hundred eighty degrees so as to dispose the face 43 thereof in contact with the bearing cap or cover 46, in which case the bore 42 would have its axis disposed at a maximum distance from the agitator axis. The structure of Fig. 8 preferably includes a suitable means for precluding any possibility of lateral shifting of the bearing element 41 in the direction of the axis of bore 42. For the purpose of illustration, such means may be in the form of an extending pin or the like 48 carried by the bearing cap 46 and adapted to extend into any one of a series of recesses or seats 49 provided in the outer faces 43, 44 and 45 of the bearing element.

The primary difference between the constructions indicated in Figs. 1 and 2 and those exemplified by Figs. 7 and 8, is that the Figs. 1 and 2 construction contemplates the use of a series of different sized agitator bars, whereas the Figs. 7 and 8 modifications do not require the substitution of agitator bars of more than one or two different sizes. The use of the Fig. 7 construction requires the baker to substitute bored bearing caps or elements 35 in order to adapt the mixer for properly handling different types of dough, whereas the Fig. 8 construction eliminates entirely the stocking of any substitute parts, it being necessary for the baker only to remove the angular block bearing elements 41 and shift them ninety degrees or one hundred eighty degrees as explained previously, in order to dispose the agitator bars closer to the tank wall.

In conclusion, it will be noted that the several structures herein disclosed present the advantage that the agitator bars are removable bodily from the tank through the opening in the top thereof, preferably while the tank is tilted without requiring loosening or shifting of the agitator spiders relative to the main or central shaft 16. It will also be observed that there is no need to provide holes in the tank ends or to otherwise alter the tank construction in order to effect a substitution of agitator bars or bearings. It is evident, therefore, that the means of the present invention may readily be embodied in existing dough mixers, if desired.

What is claimed is:

1. In a mixing machine for plastic substance, the combination of a tank having a working surface, an agitator bar, an agitator body having an arm with a transverse free end face movable past said surface, said end face being at the extreme end of the arm to enable the bar to rest on said free end upon disposition of the arm to a vertically extended position, and a cap on the free end for removably securing said bar directly upon said free end face of the agitator arm.

2. In a mixing machine for plastic substance, the combination of a tank having a working surface, an agitator bar, an agitator body having a radially extending arm with an end face including an open-topped socket for reception of the agitator bar to be moved past said surface, and a removable cap on the free end for mounting said agitator bar in said open-topped socket in contact upon the end face of the agitator arm to provide for bodily removal and replacement of said bar by shifting it in the direction of extension of the arm rather than crosswise thereof, said end face being transverse to the bar so as to support the bar unaided when the agitator arm is disposed vertically upward with the mounting means removed.

3. In a mixing machine for varying substances, the combination of a tank having a working surface, an agitator body mounted for movement about a substantially horizontal axis within said tank and including a radially extending arm with an end movable past said surface, a holding cap on the end of the agitator arm, a series of differing agitator bars, and releasable means on the arm end adapted to force the cap toward the agitator axis for removably supporting a selected one of the agitator bars upon the extending arm of the agitator body, the bar selected depending upon the nature of the substance to be mixed.

4. In a mixing machine for varying substances, the combination of a tank having a working surface, an agitator body mounted for movement within said tank and including a radially extending member with an outer end movable past said surface, a series of agitator bars of progressively increasing diameters, and releasable means associated with said radially extending member for removably supporting a selected one of the agitator bars, the selection being dependent upon the nature of the substance to be mixed.

5. In a mixing machine for varying substances, the combination of a tank having a working surface, an agitator body mounted for movement within the tank and including an outwardly extending arm member with an outer end movable past said surface, an agitator bar supported upon said outwardly extended member, the support means therefor comprising one of a series of interchangeable blocks each having a differently located bearing bore therein for engaging the agitator bar and supporting said bar at different distances from the working surface of the tank.

6. In a mixing machine for varying substances, the combination of a tank having a working surface, an agitator body mounted for movement within the tank and including a radially extending member with an outer end movable past said surface, an agitator bar supported upon said radially extended member, the support means therefor comprising a bodily removable and shiftable square block having an eccentrically located transverse bearing therein for engaging the agitator bar and supporting said bar at different distances from the working surface of the tank.

7. In a mixing machine for varying substances, the combination of a tank having a working surface, an agitator body mounted for movement within the tank and including a radially extending member with an outer end movable past said surface, an agitator bar supported upon said radially extended member, the support means therefor comprising an angular block adapted for a limited number of seating positions upon the radially extending member, said block having a bearing located therein at different distances from the block edges for supporting the agitator bar at different locations relative to the radially extending member upon disposition of the block to its different seating positions.

8. In a mixing machine for plastic substance, the combination of a tank having a working surface, an agitator body having an outwardly extending arm with an end face movable past said surface, an agitator bar, and means comprising an end cap fitted to the end face of the arm for mounting the agitator bar upon said arm near the end thereof for bodily removal and replacement of said bar by means of a shifting movement in the direction of extension of the arm rather than crosswise thereof.

ERWIN S. MASON.
WILLIAM G. KIRCHHOFF.